United States Patent
Ryu et al.

(10) Patent No.: US 10,153,469 B2
(45) Date of Patent: Dec. 11, 2018

(54) NON-WOVEN FABRIC MADE FROM FIBER COATED WITH ORGANIC BINDER POLYMER COMPOUND, ELECTROCHEMICAL CELL COMPRISING THE NON-WOVEN FABRIC, AND METHOD FOR MAKING THE NON-WOVEN FABRIC

(71) Applicant: LG Chem, Ltd., Seoul (KR)

(72) Inventors: Bo-Kyung Ryu, Daejeon (KR); Jin-Woo Kim, Daejeon (KR); Ji-Eun Lee, Daejeon (KR); So-Mi Jeong, Daejeon (KR); Jong-Hun Kim, Daejeon (KR)

(73) Assignee: LG Chem, Ltd. (KR)

( * ) Notice: Subject to any disclaimer, the term of this patent is extended or adjusted under 35 U.S.C. 154(b) by 911 days.

(21) Appl. No.: 14/288,883

(22) Filed: May 28, 2014

(65) Prior Publication Data
US 2014/0272525 A1    Sep. 18, 2014

Related U.S. Application Data

(63) Continuation of application No. PCT/KR2013/011037, filed on Nov. 29, 2013.

(30) Foreign Application Priority Data

Nov. 30, 2012 (KR) .................. 10-2012-0138494
Nov. 29, 2013 (KR) .................. 10-2013-0147402

(51) Int. Cl.
*H01M 2/16* (2006.01)
*H01M 2/14* (2006.01)
(Continued)

(52) U.S. Cl.
CPC .............. *H01M 2/162* (2013.01); *D01D 5/06* (2013.01); *D01F 11/00* (2013.01); *D04H 3/12* (2013.01);
(Continued)

(58) Field of Classification Search
None
See application file for complete search history.

(56) References Cited

U.S. PATENT DOCUMENTS 3,837,988 A    9/1974 Hennen et al.
4,351,683 A    9/1982 Kusilek
(Continued)

FOREIGN PATENT DOCUMENTS

CN    101395316 A    3/2009
CN    102164736 A    8/2011
(Continued)

OTHER PUBLICATIONS

International Search Report from PCT/KR2013/011037, dated Mar. 21, 2014.
(Continued)

*Primary Examiner* — Daniel S Gatewood
(74) *Attorney, Agent, or Firm* — Lerner, David, Littenberg, Krumholz & Mentlik, LLP (57) ABSTRACT

The present disclosure relates to a non-woven fabric made from a fiber coated with a binder polymer by spinning a non-woven forming fiber in an organic binder polymer compound solution, an electrochemical cell using the non-woven fabric as a separator substrate, and a method of making the non-woven fabric, and the non-woven fabric has a pore diameter in a range of 0.001 to 10 μm, thereby providing a mechanical property required for a separator while ensuring a favorable movement of a lithium ion, and in the use of the non-woven fabric as a separator of an electrochemical cell, eliminating a need for a process of applying a separate adhesive layer, resulting in an effect of simplifying a separator manufacturing process.

11 Claims, 7 Drawing Sheets

(51) Int. Cl.
    *D01F 11/00*      (2006.01)
    *D01D 5/06*       (2006.01)
    *D04H 3/12*       (2006.01)
    *D06M 23/10*      (2006.01)
    *D06M 15/693*     (2006.01)
    *D06M 15/643*     (2006.01)
    *D06M 15/347*     (2006.01)
    *D06M 15/263*     (2006.01)

(52) U.S. Cl.
    CPC ........ *D06M 15/263* (2013.01); *D06M 15/347* (2013.01); *D06M 15/643* (2013.01); *D06M 15/693* (2013.01); *D06M 23/10* (2013.01); *H01M 2/145* (2013.01); *H01M 2/1606* (2013.01)

(56) References Cited

U.S. PATENT DOCUMENTS

| | | |
|---|---|---|
| 6,444,367 B1 | 9/2002 | Kinn et al. |
| 6,511,774 B1 | 1/2003 | Tsukuda et al. |
| 6,534,219 B1 | 3/2003 | Iijima et al. |
| 2002/0197413 A1 | 12/2002 | Daido et al. |
| 2009/0014119 A1 | 1/2009 | Wohlmann et al. |
| 2011/0081601 A1* | 4/2011 | Weber ................. H01M 2/1606 429/494 |
| 2011/0171452 A1* | 7/2011 | Ottinger ................ B29C 70/226 428/221 |
| 2012/0015228 A1* | 1/2012 | Yoon .................... H01M 2/162 429/144 |
| 2012/0258640 A1 | 10/2012 | Rice |
| 2013/0260200 A1 | 10/2013 | Yun et al. |

FOREIGN PATENT DOCUMENTS

| | | | |
|---|---|---|---|
| EP | 0354546 A2 | 2/1990 | |
| EP | 0591616 A1 | 4/1994 | |
| JP | S60-97832 A | 5/1985 | |
| JP | H04-82949 A | 3/1992 | |
| JP | 2011517704 A | 6/2011 | |
| JP | 2012092483 A | 5/2012 | |
| JP | 2012522352 A | 9/2012 | |
| KR | 2000-0027328 A | 5/2000 | |
| KR | 10-0276090 B | 2/2001 | |
| KR | 20090037552 A | 4/2009 | |
| KR | 20120111652 A | 10/2012 | |
| TW | 150385 A | 1/1990 | |
| WO | 2007016480 A2 | 2/2007 | |
| WO | WO 2009048263 A1 * | 4/2009 | .......... H01M 2/0275 |
| WO | 2010117195 A2 | 10/2010 | |
| WO | WO 2010117195 A2 * | 10/2010 | ............ H01M 2/162 |

OTHER PUBLICATIONS

Extended Search Report from European Application No. 13859475.9, dated Sep. 1, 2015.
Database WPI Week 198528 Thomson Scientific, London, GB; AN May 31, 1985—168458 XP002743497.

* cited by examiner

NON-WOVEN FABRIC MADE FROM FIBER COATED WITH ORGANIC BINDER POLYMER COMPOUND, ELECTROCHEMICAL CELL COMPRISING THE NON-WOVEN FABRIC, AND METHOD FOR MAKING THE NON-WOVEN FABRIC

CROSS-REFERENCE TO RELATED APPLICATION

The present application is a continuation of International Application No. PCT/KR2013/011037 filed on Nov. 29, 2013, which claims priority to Korean Patent Application No. 10-2012-0138494 filed in the Republic of Korea on Nov. 30, 2012 and Korean Patent Application No. 10-2013-0147402 filed in the Republic of Korea on Nov. 29, 2013, the disclosures of which are incorporated herein by reference.

TECHNICAL FIELD

The present disclosure relates to a non-woven fabric made from a fiber coated with an organic binder polymer compound, an electrochemical cell comprising the non-woven fabric as a separator substrate, and a method of making the non-woven fabric, and more particularly, to an electrochemical cell using, as a separator substrate, a non-woven fabric made from a fiber coated with an organic binder polymer compound by immersing a spun web fiber in an organic binder polymer compound solution.

BACKGROUND ART

Recently, there has been growing interest in energy storage technologies. As the application fields of energy storage technologies have been extended to mobile phones, camcorders, lap-top computers and even electric cars, efforts have increasingly been made towards the research and development of batteries. In this aspect, electrochemical cells have attracted the most attention. The development of rechargeable secondary batteries has been the focus of particular interest. In recent years, extensive research and development has been conducted to design new electrodes and batteries for the purpose of improving capacity density and specific energy of the batteries.

Among currently available secondary batteries, lithium ion secondary batteries developed in the early 1990's have received a great deal of attention due to their advantages of higher operating voltages and much higher energy densities than conventional batteries using aqueous electrolyte solutions, such as Ni-MH batteries, Ni—Cd batteries, $H_2SO_4$—Pb batteries, and the like.

Generally, a secondary battery includes a cathode, an anode, a separator interposed between the cathode and the anode, and an electrolyte solution, and among them, a separator is an important factor for determining a life span of a secondary battery and serves to electrically insulate the cathode from the anode. To use as a separator, it is preferred to have high ion permeability and excellent mechanical strength, as well as long-term stability against an electrolyte solution of an electrochemical cell.

Studies have been conducted to use, as a separator, by processing polyolefin-based materials or heat resistant materials among separator materials in a form of a film or a non-woven fabric, and a non-woven fabric has a limitation on its use due to a pore having a relatively large diameter, despite an advantage of a low cost.

DISCLOSURE

Technical Problem

In an exemplary embodiment of the present disclosure, provided is a non-woven fabric made from a fiber having a cohesive or adhesive property and a method of making the same.

Also, provided is a separator of the non-woven fabric substrate having a pore of a relatively small diameter.

Also, in an exemplary embodiment of the present disclosure, provided is a method of making the non-woven fabric.

Technical Solution

According to an exemplary embodiment of the present disclosure, provided is a non-woven fabric made from a fiber coated with an organic binder polymer compound.

The non-woven fabric may have a pore diameter in a range of 0.001 to 10 μm.

The organic binder polymer compound may be any one selected from an acryl-based adhesive compound, a rubber-based adhesive compound, a silicon-based adhesive compound and a vinyl ether-based adhesive compound, or mixtures thereof.

The fiber may be a fiber manufactured, by spinning, from any one selected from polyurethane, polyolefin-based resin such as polyethylene or polypropylene; polyamide; thermoplastic polyurethane; polyethyleneterephthalate; nylon; and their copolymers, or mixtures thereof.

The non-woven fabric may be used as a separator substrate for an electrochemical cell.

According to another exemplary embodiment of the present disclosure, provided is an electrochemical cell including a cathode, an anode, a separator interposed between the cathode and the anode, and an electrolyte, wherein the separator corresponds to the above-described separator.

The electrochemical cell may be a lithium secondary battery.

According to still another exemplary embodiment of the present disclosure, provided is a method of manufacturing a separator using a non-woven fabric including immersing a spun fiber in an organic binder polymer compound solution.

Subsequently, the method may further include calendaring the fiber coated with the organic binder polymer compound solution under conditions of temperature of 100 to 200° C. and pressure of 10 to 500 MPa.

The fiber may be a fiber obtained by spinning any one selected from polyurethane, polyolefin-based resin such as polyethylene or polypropylene; polyamide; thermoplastic polyurethane; polyethyleneterephthalate; nylon; and their copolymers, or mixtures thereof.

The organic binder polymer compound solution may be a solution, in which an acryl-based adhesive compound, a rubber-based adhesive compound, a silicon-based adhesive compound or a vinyl ether-based adhesive compound is dissolved in a solvent including any one selected from the group consisting of acetone, methylethylketone, methylisobutylketone, methyl cellosolve, ethyl cellosolve, tetrahydrofuran, 1,4-dioxane, ethylene glycol dimethyl ether, ethylene glycol diethyl ether, propylene glycol dimethyl ether, propylene glycol diethyl ether, chloroform, methylene chloride, 1,2-dichloroethane, 1,1,1-trichloroethane, 1,1,2-trichloroethane, 1,1,2-trichloroethene, 1,2,3-trichloropropane, hexane, heptane, octane, cyclopentane, cyclohexane, benzene, toluene, xylene, methanol, ethanol, isopropanol, propanol, butanol, t-butanol, propylene glycol monomethylether, propylene glycol monoethylether, propylene glycol monopropylether, propylene glycol monobutylether, dipropylene glycol dimethylether, dipropylene glycol diethylether, dipropylene glycol monomethylether, methyl carbitol, ethyl carbitol, propyl carbitol, butyl carbitol, cyclopentanone, cyclohexanone, propylene glycol methyletheracetate, propylene glycol ethyletheracetate, propylene glycol methylether propionate, 3-methoxybutyl acetate, 3-methyl-3-methoxybutyl acetate, ethyl-3-ethoxypropionate, ethyl cellosolve acetate, methyl cellosolve acetate, butyl acetate, propyl acetate and ethyl acetate, or mixtures thereof.

The organic binder polymer compound solution may have a viscosity in a range of 1 to 100 centipoise (cp).

Advantageous Effects

A fiber comprising a non-woven fabric made in the present disclosure is coated with an organic binder polymer, and a separator using the non-woven fabric as a substrate may have a pore with a smaller diameter, for example, in a range of 0.001 to 10 μm. Accordingly, a mechanical property issue intrinsic to a non-woven fabric substrate separator may be overcome, while ensuring a favorable movement of a lithium ion.

Also, in the use of a non-woven fabric as a separator of an electrochemical cell, a need to form a separate adhesive layer is eliminated, resulting in an effect of simplifying a separator manufacturing process.

DESCRIPTION OF THE PREFERRED EMBODIMENT

Hereinafter, the present disclosure will be described in detail. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

As used herein, the term 'non-woven fabric' represents a product made from fibers by mechanical treatment that arranges and entangles the fibers in a parallel or irregular direction, without performing a weaving process on the fibers.

The non-woven fabric used in the present disclosure corresponds to a web non-woven fabric made from a material that can be used as a separator for an electrochemical cell. This non-woven fabric is characterized by having elastic, porous, moisture-permeable, and waterproof properties while maintaining a predetermined level of strength.

As used herein, the terms 'web fiber' and 'fiber' represent a fiber that is spun and makes up a non-woven fabric, and they are interchangeably used.

In the present disclosure, a non-limiting example of a fiber comprising a non-woven fabric may include any one selected from polyurethane, polyolefin-based resin such as polyethylene or polypropylene; polyamide; thermoplastic polyurethane; polyethyleneterephthalate; nylon; and their copolymers, or mixtures thereof. Also, in the present disclosure, a non-woven fabric forming material may be produced from at least two types of materials, and besides a same type of filament fiber, different types of filament fibers may be used, preferably, for example, a bicomponent fiber containing at least one polyolefin component.

There is no particular limitation in a method of making a non-woven fabric according to an exemplary embodiment of the present disclosure if it may include a process of immersing a spun fiber in an organic binder polymer compound solution, and a non-limiting example may include a wet spinning method using a paper making method. A spinning condition is not specially limited in the present disclosure, and may correspond to a general condition in the art.

A diameter of the spun fiber is generally 20 μm or less, and for example, may be in a range of 0.5 to 18 μm or in a range of 1 to 15 μm. A cross section of the fiber may have various shapes of, generally, a circle or an oval, a furrow on the surface, a small strip, a triangle or a polygon, and the like.

The fiber may have a weight per unit area in a range of 5 to 20 g/m², however the present disclosure is not limited thereto.

Figure 3:
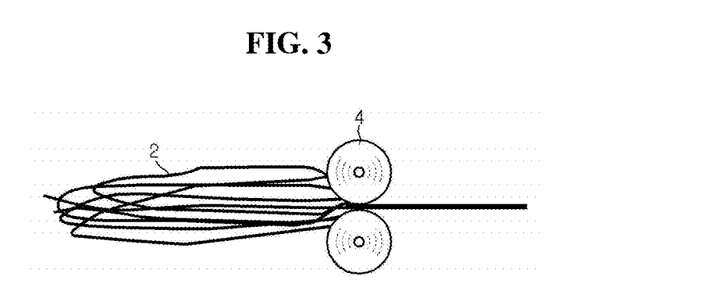

The fiber of the non-woven fabric according to an exemplary embodiment of the present disclosure is coated with the organic binder polymer compound. Its example is illustrated in FIG. 3, and it can be seen that a fiber is coated with an organic binder polymer compound (indicated by an arrow). Since the fiber is coated with the organic binder polymer compound, the non-woven fabric made from the fiber has a cohesive or adhesive strength without applying a separate adhesive layer or an adhesive agent.

For example, when a separator formed from the fiber coated with the organic binder polymer compound is interposed between a cathode and an anode and laminated by applying heat of 80 to 150° C. and pressure, adhesion of the separator and the electrode may be made even though an additional separate adhesive layer is not included, and in this instance, an adhesive level is in a range of 10 to 100 gf/25 mm. Here, the 'adhesive level' presents a strength measured when pulling the separator at 100 mm/min and 180 degrees.

In this instance, a non-limiting example of the rubber-based adhesive compound may include a synthetic polyisoprene rubber, a styrene-isoprene-styrene block copolymer, natural rubber, polyisobutylene, polybutene, and the like.

A non-limiting example of the acryl-based adhesive compound may include a homopolymer or copolymer of an acrylic ester-based monomer including butyl acrylate, isononyl acrylate, and 2-ethyl hexyl acrylate, or a copolymer of such an acrylic acid ester-based monomer and another monomer including acrylic acid, 2-hydroxy ethyl acrylate, vinyl acetate, and the like.

The web fiber comprising the non-woven fabric may be used to form a non-woven fabric substrate through a general process known in the art, and besides a single-layered structure, the non-woven substrate may be used in a multi-layered structure to provide various characteristics, if necessary. The multilayered structure is not limited to a stack structure of multiple types of non-woven fabric substrates, and includes a stack structure of different types of substrates including a plastic film, a non-woven fabric, a porous layer, and the like.

A pore diameter in the non-woven fabric substrate and a thickness of the non-woven fabric substrate may be different based on a diameter of the fiber, an extent to which the fiber accumulates during making the non-woven fabric, and the like, and may be adjusted through a calendering process. In an exemplary embodiment, a pore in the non-woven fabric substrate may have a diameter in range of 0.001 to 10 μm when measuring with a capillary flow porometer, and when the pore diameter falls within the range, a favorable movement of a lithium ion may be ensured.

Also, a thickness of the non-woven fabric substrate may be in a range of 0.1 to 100 μm or in a range of 5 to 50 μm. The thickness of the non-woven fabric substrate satisfying the range is preferred in terms of elasticity, workability, durability, and unnecessary volume increase prevention.

A permeability of the non-woven fabric substrate may be in a range of 1 to 10 sec/100 mL.

Another exemplary embodiment of the present disclosure relates to a method of making a porous web non-woven fabric.

Figure 1:
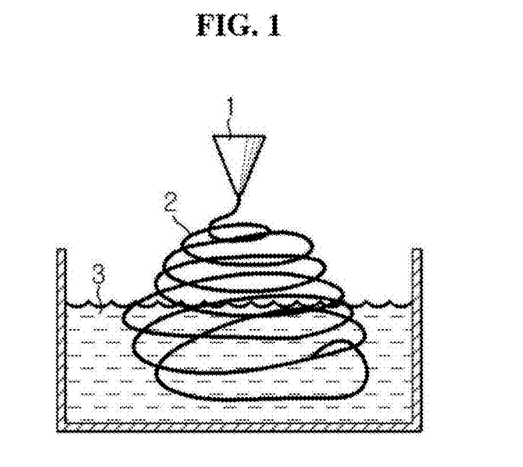
FIGS. 1 through 3 schematically illustrate a method of making a non-woven fabric according to a related art.
Figure 2:
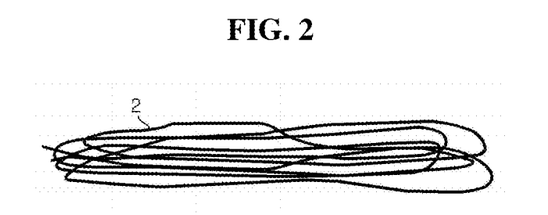

An embodiment of a method of making a non-woven fabric according to a related art is schematically illustrated in FIGS. 1 through 3. According to a related art, the method includes spinning a web fiber 2 in a conventional solution 3 through a spinning device 1 (FIG. 1), drying the web 2 (FIG. 2), and calendaring the dry web 2 by a calendaring roll 4 (FIG. 3). Here, the 'conventional solution' represents a solution in which an organic binder polymer compound is not included. Subsequently, to provide an adhesive property to the non-woven fabric, an operation of forming an adhesive layer is additionally performed in the conventional method.

Figure 4:
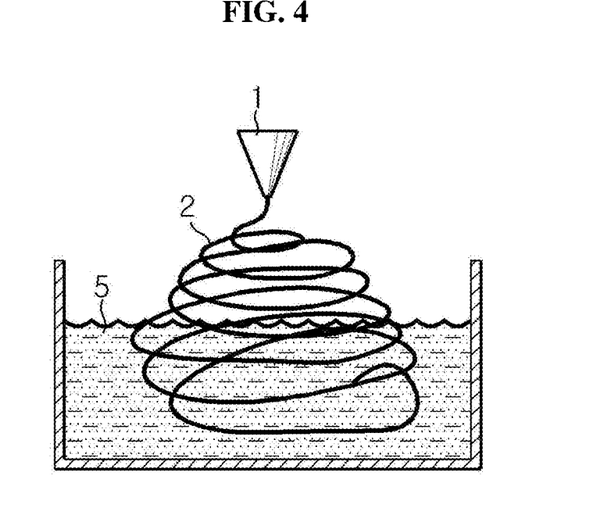
FIGS. 4 through 6 schematically illustrate a method of making a non-woven fabric according to the present disclosure.
Figure 5:
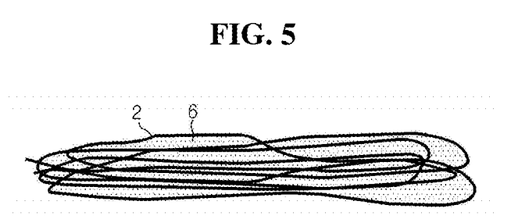
Figure 6:
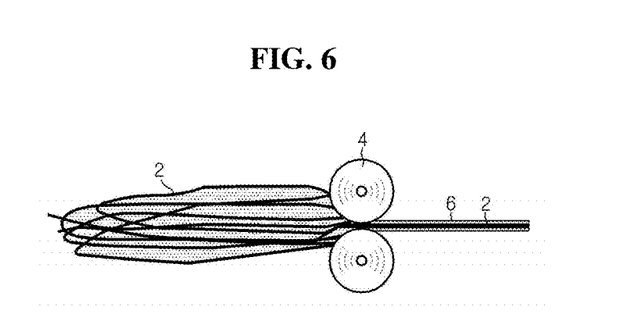
Figure 7:
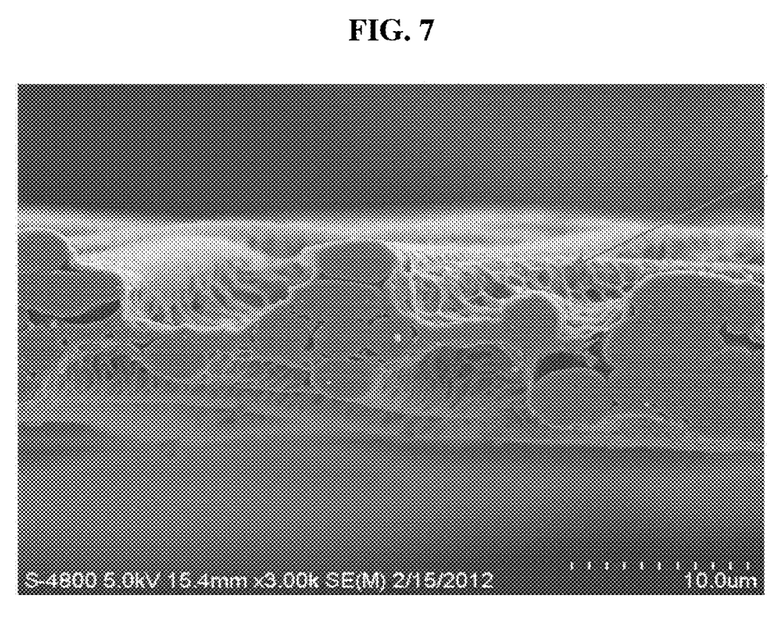
FIG. 7 is a 3000 times-magnified photographic image of a non-woven fabric made according to the present disclosure.

The method of making a non-woven fabric according to an exemplary embodiment of the present disclosure is schematically illustrated in FIGS. 4 through 6. According to the present disclosure, the method includes immersing a web fiber 2 spun through a spinning device 1 in a binder polymer compound solution (FIG. 4), drying the web 2 having a binder polymer compound coating 6 (FIG. 5), and calendaring the dry web 2 by a calendaring roll 4 under temperature and pressure conditions allowing a target pore diameter (FIG. 6). The resulting non-woven web fiber has a cohesive or adhesive property.

In the specification, the organic binder polymer compound solution represents a solution in which an acryl-based adhesive compound, a rubber-adhesive compound, a silicon-based adhesive compound, or a vinyl ether-based adhesive compound is dissolved in a solvent. The solvent may include, but is not limited to, any one selected from the group consisting of acetone, methylethylketone, methylisobutylketone, methyl cellosolve, ethyl cellosolve, tetrahydrofuran, 1,4-dioxane, ethylene glycol dimethyl ether, ethylene glycol diethyl ether, propylene glycol dimethyl ether, propylene glycol diethyl ether, chloroform, methylene chloride, 1,2-dichloroethane, 1,1,1-trichloroethane, 1,1,2-trichloroethane, 1,1,2-trichloroethene, 1,2,3-trichloropropane, hexane, heptane, octane, cyclopentane, cyclohexane, benzene, toluene, xylene, methanol, ethanol, isopropanol, propanol, butanol, t-butanol, propylene glycol monomethylether, propylene glycol monoethylether, propylene glycol monopropylether, propylene glycol monobutylether, dipropylene glycol dimethylether, dipropylene glycol diethylether, dipropylene glycol monomethylether, methyl carbitol, ethyl carbitol, propyl carbitol, butyl carbitol, cyclopentanone, cyclohexanone, propylene glycol methyletheracetate, propylene glycol ethyletheracetate, propylene glycol methylether propionate, 3-methoxybutyl acetate, 3-methyl-3-methoxybutyl acetate, ethyl-3-ethoxypropionate, ethyl cellosolve acetate, methyl cellosolve acetate, butyl acetate, propyl acetate and ethyl acetate, or mixtures thereof. It is preferred that the binder polymer compound solution has a viscosity in a range of 1 to 100 centipoise (cp) in view of uniform coating of the binder polymer compound on the fiber.

The binder polymer compound solution may, if necessary, further include various types of additives, for example, a plasticizer including polyhydric alcohol such as glycerin, polyethylene glycol, and polypropylene glycol, a water-soluble or water-absorbent resin such as polyacrylic acid, a cross-linked polyacrylic acid, and polyvinylpyrrolidone, a rosin-, terpene- or petroleum-based tackifier, a softener, a filler, a pigment, and the like.

The web fiber coated with the binder polymer compound may be dried at temperature of 40 to 100° C. for 1 to 10 minutes in a general manner in the art. The drying temperature within the range is preferred because drying is achieved in a short period of time and melting of the fiber or the binder polymer is prevented.

The dry web fiber may be calendared in a temperature range of 100 to 200° C. When the calendaring temperature satisfies the range, an appropriate tensile strength of the non-woven fabric and proper spacing between the fibers may be achieved and melting of the spun fiber and the binder polymer may be prevented.

Also, the calendaring pressure may be set to a range of 1 to 10 bar. The calendaring pressure satisfying the range is preferred in terms of a tensile strength of the non-woven fabric, spacing between the fibers, and roller durability.

The non-woven fabric made as described in the foregoing does not have a special limitation in its use, and particularly, may be used as a separator for an electrochemical cell.

The electrode that will be applied along with the separator of the present disclosure is not limited to a specific type, and may be manufactured in a manner of bonding an electrode active material to an electrode current collector by a general method known in the art.

In the electrode active material, a cathode active material may include, as a non-limiting example, any cathode active material usable in a cathode of a conventional electrochemical cell, in particular, lithium manganese oxide, lithium cobalt oxide, lithium nickel oxide, lithium iron oxide, or lithium composite oxides thereof.

A non-limiting example of an anode active material may include any anode active material usable in an anode of a conventional electrochemical cell, in particular, a material capable of absorbing/desorbing lithium such as a lithium metal or a lithium alloy, carbon, petroleum coke, activated carbon, graphite, or other carbons.

The cathode current collector may be, as a non-limiting example, a foil made from aluminum, nickel or a combination thereof, and the anode current collector may be, as a non-limiting example, a foil made from copper, gold, a nickel or copper alloy, or combinations thereof.

The electrolyte solution usable in the present disclosure may be an electrolyte solution in which an electrolyte salt, for example, of $A^+B^-$ structure, where $A^+$ represents an ion including an alkali metal cation such as $Li^+$, $Na^+$ and $K^+$, or combinations thereof, and $B^-$ represents an ion including an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$ and $C(CF_2SO_2)_3^-$, or combinations thereof, is dissolved or dissociated in an electrolyte solvent including, but is not limited to, propylene carbonate (PC), ethylene carbonate (EC), diethyl carbonate (DEC), dimethyl carbonate (DMC), dipropyl carbonate (DPC), dimethylsulfoxide, acetonitrile, dimethoxyethane, diethoxyethane, tetrahydrofuran, N-methyl-2-pyrrolidone (NMP), ethylmethylcarbonate (EMC), gamma butyrolactone, or mixtures thereof.

Injection of the electrolyte solution may be performed in a proper step among a battery fabrication process based on a manufacturing process and required physical properties of a final product. That is, injection of the electrolyte solution may be applied before battery assembling or in a final step of battery assembling.

Optionally, the electrode according to the present invention may further include a conductive material, a binder, a filler, and the like, if necessary.

The conductive material may include, but is not limited to, acetylene black, carbon black, and the like.

The binder may be at least one selected from the group consisting of polytetrafluoroethylene, polyvinylidene fluoride, polyvinyl fluoride, polyacrylonitrile, nitrile rubber, polybutadiene, polystyrene, styrene butadiene rubber, polysulfide rubber, butyl rubber, hydrogenated styrene butadiene rubber, nitrocellulose, and carboxymethylcellulose.

The battery according to the present disclosure may be manufactured by a general method known in the art, for example, in a manner of dispersing an electrode active material and a binder in an organic solvent to prepare a slurry, coating the slurry on an electrode current collector, drying and compressing the result, and interposing the separator between the cathode and the anode, however the present disclosure is not limited thereto.

What is claimed is:

1. A method of manufacturing a non-woven fabric for a separator, the method comprising:
   immersing a spun fiber in an organic binder polymer compound solution,
   drying the spun fiber having a coating of the organic binder polymer compound solution,
   calendaring the fiber coated with the organic binder polymer compound solution using a calendaring roll under conditions of temperature of 100 to 200° C. and pressure of 10 to 500 MPa, and
   forming the non-woven fabric made from the spun fiber coated with the organic binder polymer compound solution.

2. The method according to claim 1, wherein the fiber is obtained by spinning any one selected from polyurethane, polyolefin-based resin, polyamide, thermoplastic polyurethane, polyethyleneterephthalate, nylon and their copolymers, or mixtures thereof.

3. The method according to claim 1, wherein the organic binder polymer compound solution is a solution in which an acryl-based adhesive compound, a rubber-based adhesive compound, a silicon-based adhesive compound or a vinyl ether-based adhesive compound is dissolved in a solvent including any one selected from the group consisting of acetone, methylethylketone, methylisobutylketone, methyl cellosolve, ethyl cellosolve, tetrahydrofuran, 1,4-dioxane, ethylene glycol dimethyl ether, ethylene glycol diethyl ether, propylene glycol dimethyl ether, propylene glycol diethyl ether, chloroform, methylene chloride, 1,2-dichloroethane, 1,1,1-trichloroethane, 1,1,2-trichloroethane, 1,1,2-trichloroethene, 1,2,3-trichloropropane, hexane, heptane, octane, cyclopentane, cyclohexane, benzene, toluene, xylene, methanol, ethanol, isopropanol, propanol, butanol, t-butanol, propylene glycol monomethylether, propylene glycol monoethylether, propylene glycol monopropylether, propylene glycol monobutylether, dipropylene glycol dimethylether, dipropylene glycol diethylether, dipropylene glycol monomethylether, methyl carbitol, ethyl carbitol, propyl carbitol, butyl carbitol, cyclopentanone, cyclohexanone, propylene glycol methyletheracetate, propylene glycol ethyletheracetate, propylene glycol methylether propionate, 3-methoxybutyl acetate, 3-methyl-3-methoxybutyl acetate, ethyl-3-ethoxypropionate, ethyl cellosolve acetate, methyl cellosolve acetate, butyl acetate, propyl acetate and ethyl acetate, or mixtures thereof.

4. The method according to claim 3, wherein the organic binder polymer compound solution has a viscosity in a range of 1 to 100 centipoise (cp).

5. A non-woven fabric for a separator prepared by the method of claim 1.

6. The non-woven fabric according to claim 5, wherein the non-woven fabric has a pore diameter in a range of 0.001 to 10 μm.

7. The non-woven fabric according to claim 5, wherein the organic binder polymer compound is any one selected from an acryl-based adhesive compound, a rubber-based adhesive compound, a silicon-based adhesive compound and a vinyl ether-based adhesive compound, or mixtures thereof.

8. The non-woven fabric according to claim 5, wherein the fiber is spun from any one selected from polyurethane, polyolefin-based resin, polyamide, thermoplastic polyurethane, polyethyleneterephthalate, nylon and their copolymers, or mixtures thereof.

9. A separator for an electrochemical cell using the non-woven fabric defined in claim 5 as a substrate.

10. An electrochemical cell comprising a cathode, an anode, a separator interposed between the cathode and the anode, and an electrolyte,
   wherein the separator is a the separator defined in claim 9.

11. The electrochemical cell according to claim 10, wherein the electrochemical cell is a lithium secondary battery.

* * * * *